(12) United States Patent
Kayama et al.

(10) Patent No.: US 6,614,770 B1
(45) Date of Patent: Sep. 2, 2003

(54) MOBILE STATION APPARATUS AND BASE STATION APPARATUS

(75) Inventors: Hidenori Kayama, Yokosuka (JP); Toyoki Ue, Yokosuka (JP); Kazuyuki Miya, Kawasaki (JP); Takashi Kitade, Yokosuka (JP); Mitsuru Uesugi, Yokosuka (JP); Osamu Kato, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/384,190

(22) Filed: Aug. 27, 1999

(30) Foreign Application Priority Data

Sep. 7, 1998 (JP) .......................................... 10-252993

(51) Int. Cl.<sup>7</sup> ................................................ H04Q 7/00
(52) U.S. Cl. ........................ 370/331; 370/477; 370/470; 455/525
(58) Field of Search ................................ 370/331–337, 370/342, 477, 468, 470, 471, 473, 474; 714/704, 708, 751, 822; 455/561, 524, 525, 63, 62, 450

(56) References Cited

U.S. PATENT DOCUMENTS 6,122,270 A * 9/2000 Whinnett et al. ............ 370/342
6,339,590 B2 * 1/2002 Kim ............................ 370/331

FOREIGN PATENT DOCUMENTS

| EP | 0652650 | 5/1995 |
|----|---------|--------|
| EP | 0981256 | 2/2000 |
| JP | 8-500475 | 1/1996 |
| JP | 9-247131 | 9/1997 |
| WO | 86/03317 | 6/1986 |
| WO | 94/29981 | 12/1994 |
| WO | 96/13914 | 5/1996 |
| WO | 97/09831 | 3/1997 |
| WO | 97/40592 | 10/1997 |

OTHER PUBLICATIONS

English Language Abstract of JP 9–247131.
English Language Abstract of WO 94/29981.

* cited by examiner

Primary Examiner—Dwayne Bost
Assistant Examiner—James Moore
(74) Attorney, Agent, or Firm—Greenblum & Bernstein, P.L.C.

(57) ABSTRACT

The base station apparatus compresses one-frame information of a broadcast channel to blocks of ½ of one frame or less and repeatedly sends this block in a one-frame time. The mobile station apparatus decodes the received signal in block units or added block units to carry out error detection. The mobile station apparatus receives and adds up the next block in the case that the error rate exceeds a threshold. The mobile station apparatus repeats this until the error rate falls below the threshold. When the error rate falls below the threshold, the mobile station apparatus stops reception of broadcast channel signals and uses the rest of time until a one-frame time elapses to monitor carrier information of a different mobile communication system for handover.

10 Claims, 9 Drawing Sheets

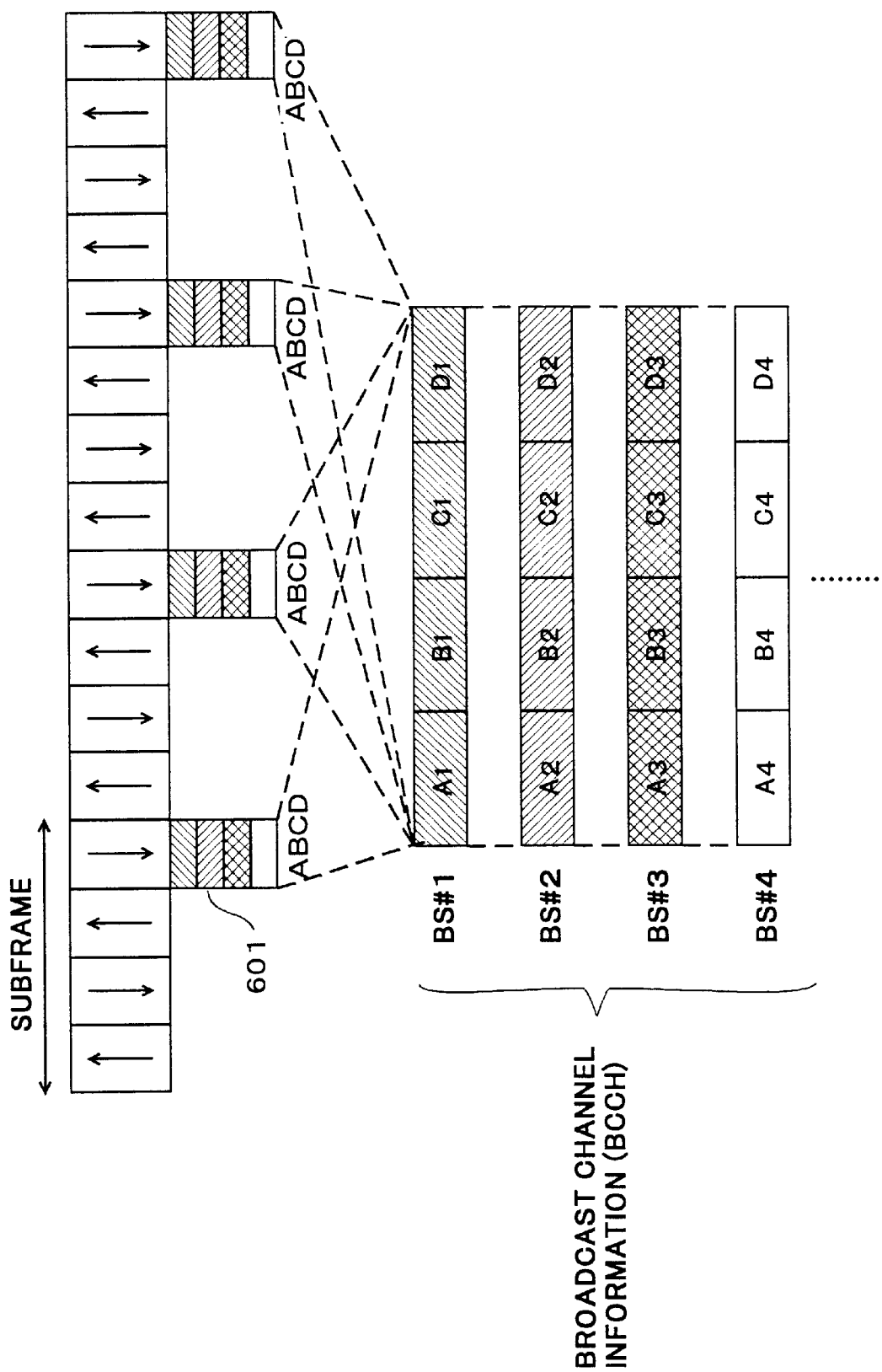

MOBILE STATION APPARATUS AND BASE STATION APPARATUS

BACKGROUND OF THE INVENTION

1. Field of the Invention

The present invention relates to a mobile station apparatus and base station apparatus using a CDMA (Code Division Multiple Access) system.

2. Description of the Related Art

In a CDMA (Code Division Multiple Access) based mobile communication system, in the case that a mobile station carries out handover to a mobile communication systems service using a different system (for example, FDMA system, TDMA system, etc.)(hereinafter simply referred to as a "different mobile communication system") or handover to the same CDMA mobile communication system with a different carrier frequency, the mobile station needs to monitor information on the carrier of the handover destination before carrying out handover to carry it out smoothly.

FIG.1 is a schematic view of cells to explain the situation of the handover. Suppose there are 3 cells in this case. When mobile station 12 connected to base station 11 moves from cell 13 to cell 14 which is a cell of a different mobile communication system, the mobile station needs to receive a control channel signal transmitted by base station 15 of cell 14, the destination, and monitor the control channel of base station 15.

There are mainly two types of channels used in CDMA-based mobile communications, control channel and communication channel. A control channel signal is transmitted from a base station to all mobile stations in the same cell. A broadcast channel (BCCH) signal is mapped in the control channel signal, and the broadcast channel signal mainly contains synchronization-related information, downlink transmission power information and uplink interference power information, etc. A communication channel signal is transmitted/received between the base station and mobile station and the communication channel is a channel for communicating data comprising a message signal.

FIG. 2 is a schematic view showing frame structures of a communication channel signal and control channel signal that a conventional base station apparatus transmits. The communication channel signal is divided into frames of 10 msec, for example and these frames are further divided into 16 slots, for example. Such frame-structured communication channel signals are used for data communications. The broadcast channel signal is transmitted over one entire frame of the communication channel signal of 10 msec, for example.

Such a frame structure does not allow the mobile station to have a free time to monitor the carrier information of a different mobile communication system. Therefore, the conventional base station takes the following measure for a communication channel signal to be transmitted.

FIG. 3A, FIG. 3B and FIG. 3C are schematic views of frame structures of a transmission signal of a conventional base station apparatus. FIG. 3A shows a frame structure of a communication channel signal during a normal communication.

The frame structure during monitoring is explained using FIG. 3B and FIG. 3C. FIG. 3B shows a frame structure when transmitting data using the first half of one frame at a double transmission rate by adding one-frame information of the communication channel signal in the base station apparatus. FIG. 3C shows a frame structure when transmitting the added information in FIG. 3B using the front end and back end of the frame by dividing one frame into 4 parts in the base station apparatus.

In the case that the base station transmits the communication channel signal with such a frame structure to the mobile station, a blank time zone (hereinafter referred to as "idle interval") is produced in the frame as shown in the figure, and the mobile station on the receiving side has no data to be received in this idle interval. Therefore, the mobile station can use this idle interval in the communication channel to monitor a control channel of a different mobile communication system.

Therefore, the mobile station can establish synchronization at the time of handover based on the carrier information of a different mobile communication system at the handover destination received, making it possible to carry out smooth handover.

However, the conventional apparatus has problems as shown below: That is, the conventional base station transmits a frame-structured communication channel signal having an idle interval to the mobile station so as to provide the mobile station with an idle interval to receive the control channel signal at the handover destination. Therefore, the transmission signal from the base station has a blank time during which no data are sent, causing signal interruption on the radio communication line.

Furthermore, the conventional mobile station cannot perform correct reception or decoding unless it is notified beforehand of the timing with which added data with a high transmission rate are incoming, and it is necessary to assign new channel resources to transmit the timing-related information from the base station to mobile station. Therefore, In the case that there are not enough channel resources, it is difficult for the mobile station to receive the carrier information of the different mobile communication system.

SUMMARY OF THE INVENTION

It is an objective of the present invention to provide a mobile station apparatus and base station apparatus that form a blank time for the mobile station apparatus to receive a control channel signal of a different mobile communication system in a broadcast channel, causing no signal interruption of a radio communication line at the time of handover and without requiring assignment of further channel resources.

In order to achieve the objective above, the base station apparatus of the present invention compresses one-frame information of the broadcast channel signal to a block of ½ of one frame or less and repeatedly transmits this block during a one-frame time. On the other hand, the mobile station apparatus decodes these repeatedly transmitted blocks in block units or added block units and performs error detection and in the case that the error rate exceeds a threshold, it receives and adds up the next block. The mobile station apparatus repeats this operation until the error rate falls below the threshold. Furthermore, when the error rate falls below the threshold, the mobile station apparatus stops reception of broadcast channel signals and uses the rest of time until a one-frame time elapses to monitor a control channel of a different mobile communication system necessary for handover.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 9 is a schematic view showing a structure example of a broadcast channel of the embodiment above.

DETAILED DESCRIPTION OF THE PREFERRED EMBODIMENTS

With reference now to the attached drawings, the embodiment of the present invention is explained in detail below.

Figure 1:
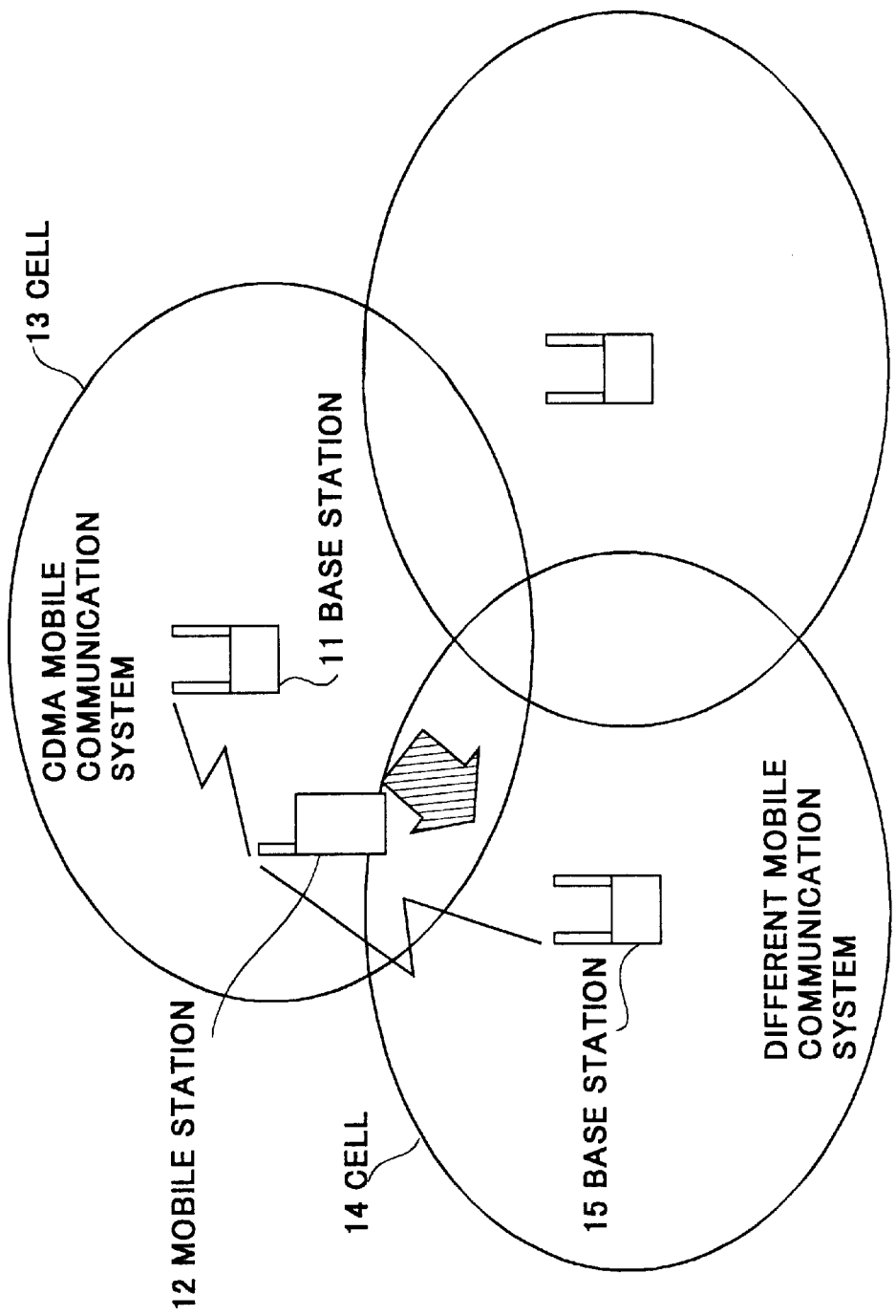
FIG. 1 is a schematic diagram of cells to explain a situation at the time of handover.
Figure 2:
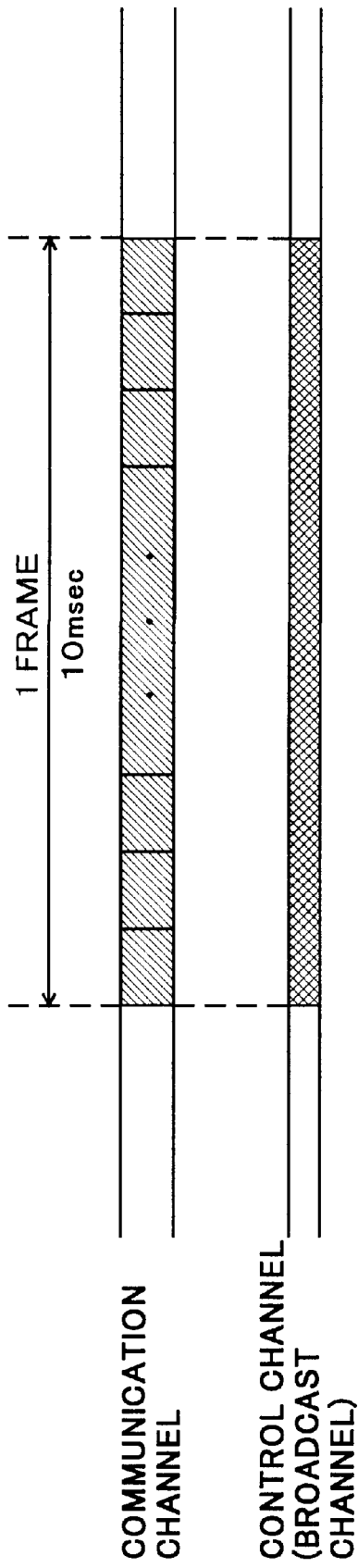
FIG. 2 is a schematic diagram of frame structure of a communication channel signal and control channel signal transmitted by a conventional base station apparatus.
Figure 3:
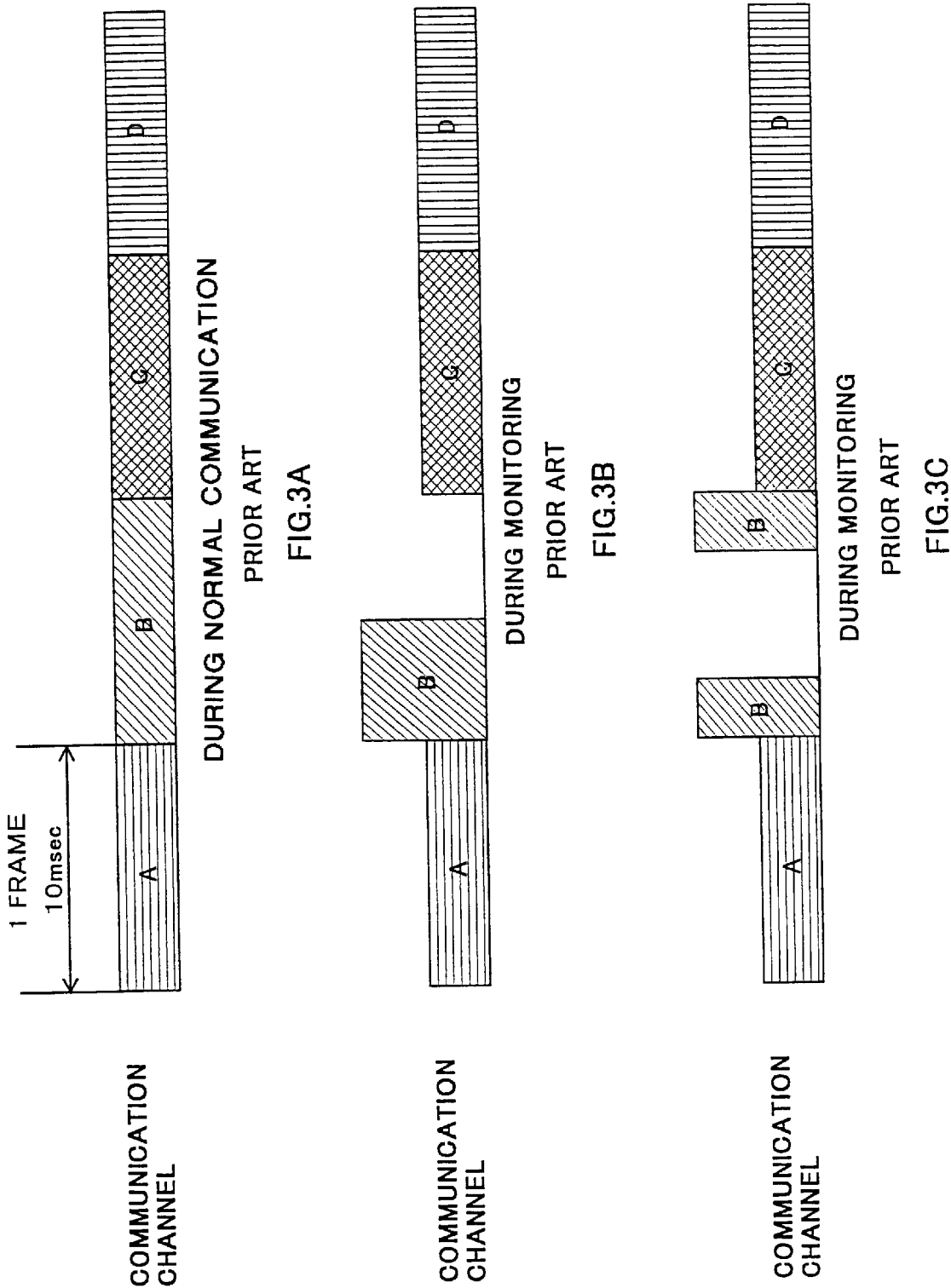
FIG. 3A is a schematic diagram of a frame structure of a transmission signal of the conventional base station apparatus during a normal communication.
FIG. 3B is a schematic diagram of a frame structure of a transmission signal of the conventional base station apparatus during monitoring.
FIG. 3C is a schematic diagram of a frame structure of a transmission signal of the conventional base station apparatus during monitoring.
Figure 4:
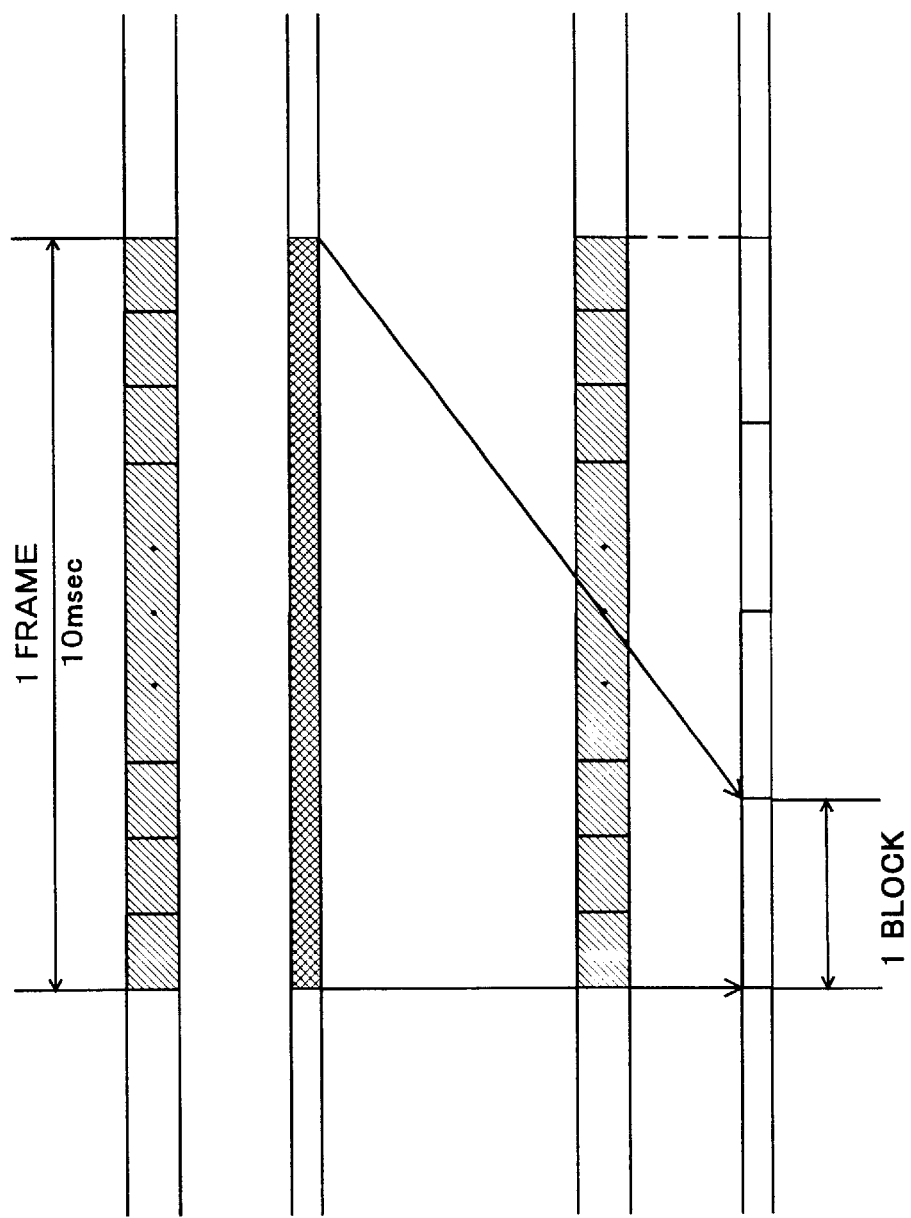
FIG. 4A is a schematic diagram showing a frame structure of a broadcast channel signal transmitted from the conventional base station apparatus.
FIG. 4B is a schematic diagram showing a frame structure of a broadcast channel signal transmitted from a base station apparatus of an embodiment of the present invention.

FIG. 4B is a schematic diagram showing a frame structure of a communication channel signal transmitted from a base station apparatus of an embodiment of the present invention and a frame structure of a broadcast channel signal transmitted, mapped on a control channel signal transmitted from the base station apparatus of the embodiment of the present invention. FIG. 4A is a schematic diagram showing a conventional frame structure used for a comparison with the present embodiment.

In the conventional apparatus, a broadcast signal is transmitted over one entire frame of 10 msec, while in the present embodiment, one-frame information of a broadcast channel signal is repeatedly transmitted at least at a double transmission rate for a period of 10 msec. The base station apparatus of the present embodiment forms blocks for every one-frame information transmitted at least at a double transmission rate and the mobile station apparatus also carries out decoding in such block units.

More specifically, as shown in FIG. 4B, for example, one-frame information of the broadcast channel signal is transmitted 4 times repeatedly at a quadruple transmission rate for 10 msec. The base station apparatus of the present embodiment forms blocks for every one-frame information transmitted at this quadruple transmission rate and the mobile station apparatus also carries out decoding in such block units. FIG. 4B explained the case where the broadcast channel signal is transmitted at a quadruple transmission rate, but the present embodiment is not limited to this and any transmission rate of the control channel signal is available in the case that it is at least a double rate.

In the present embodiment, in the case that, for example, the base station apparatus transmits one-frame broadcast channel information at a double transmission rate, the base station apparatus can transmit one-frame information, that is, one block in 5 msec. The base station apparatus sends this block twice consecutively in a one-frame period of 10 msec. In the case that, for example, the base station apparatus sends one-frame information at a ×16 transmission rate, that is, in the case that the one-block time is set to $\frac{1}{16}$ of one-frame time, the base station apparatus sends this same block 16 times in a one-frame period of 10 msec.

Thus, the base station apparatus uses a frame structure of a broadcast channel signal constructed in such a manner that same compressed information is repeatedly transmitted within one frame, so that a blank time dose not occur in signals transmitted from the base station apparatus, thereby resulting in no causes for the occurrence of signal interruption. Furthermore, since the mobile station apparatus can obtain one-frame information by only receiving one block at least, it can secure the rest of time until a one-frame time of 10 msec elapses as an idle interval and monitor the control channel of the base station apparatus which is a handover destination candidate.

Figure 5:
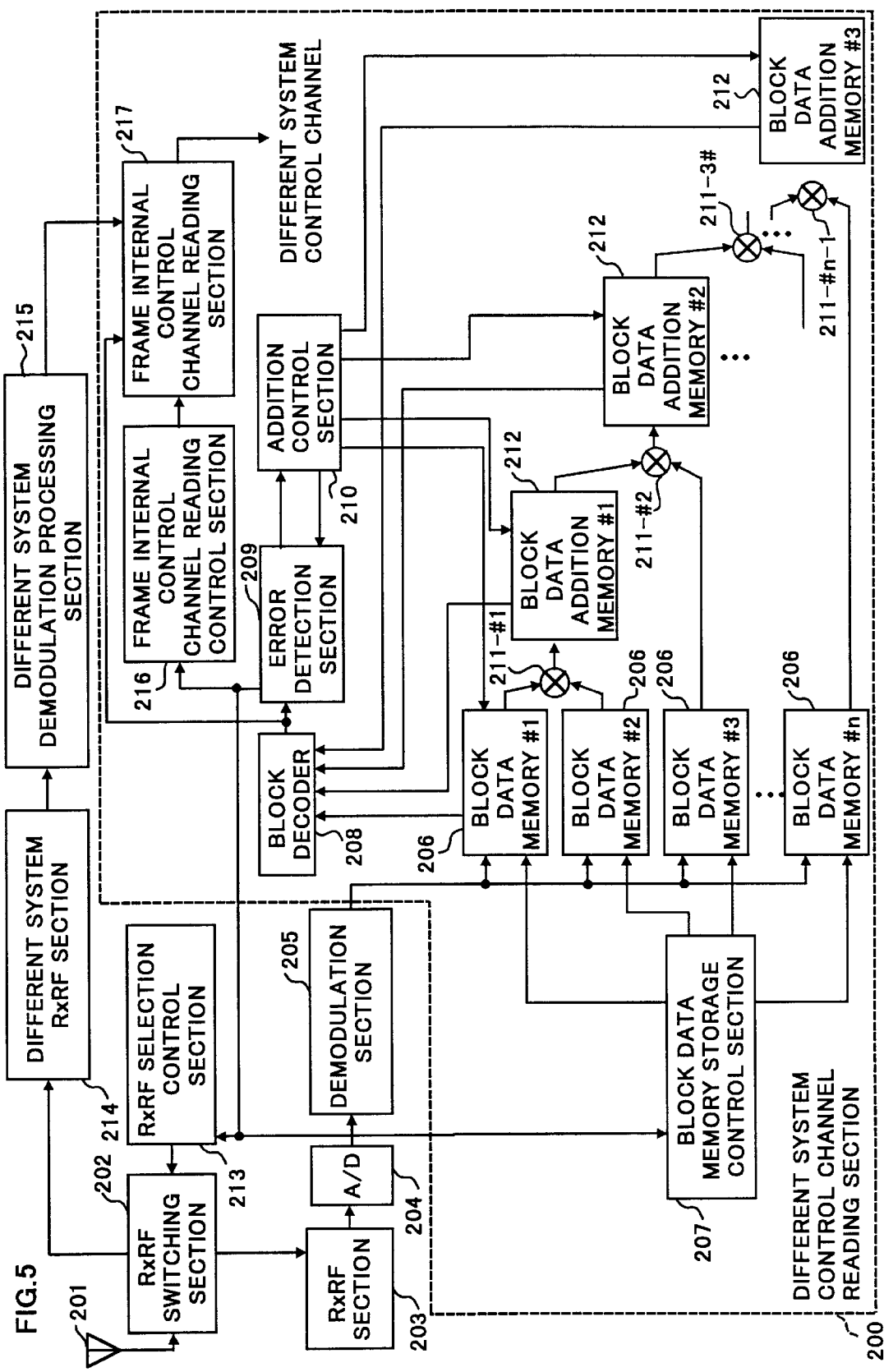
FIG. 5 is a block diagram showing the main parts of the mobile station apparatus of the embodiment above.
Figure 6:
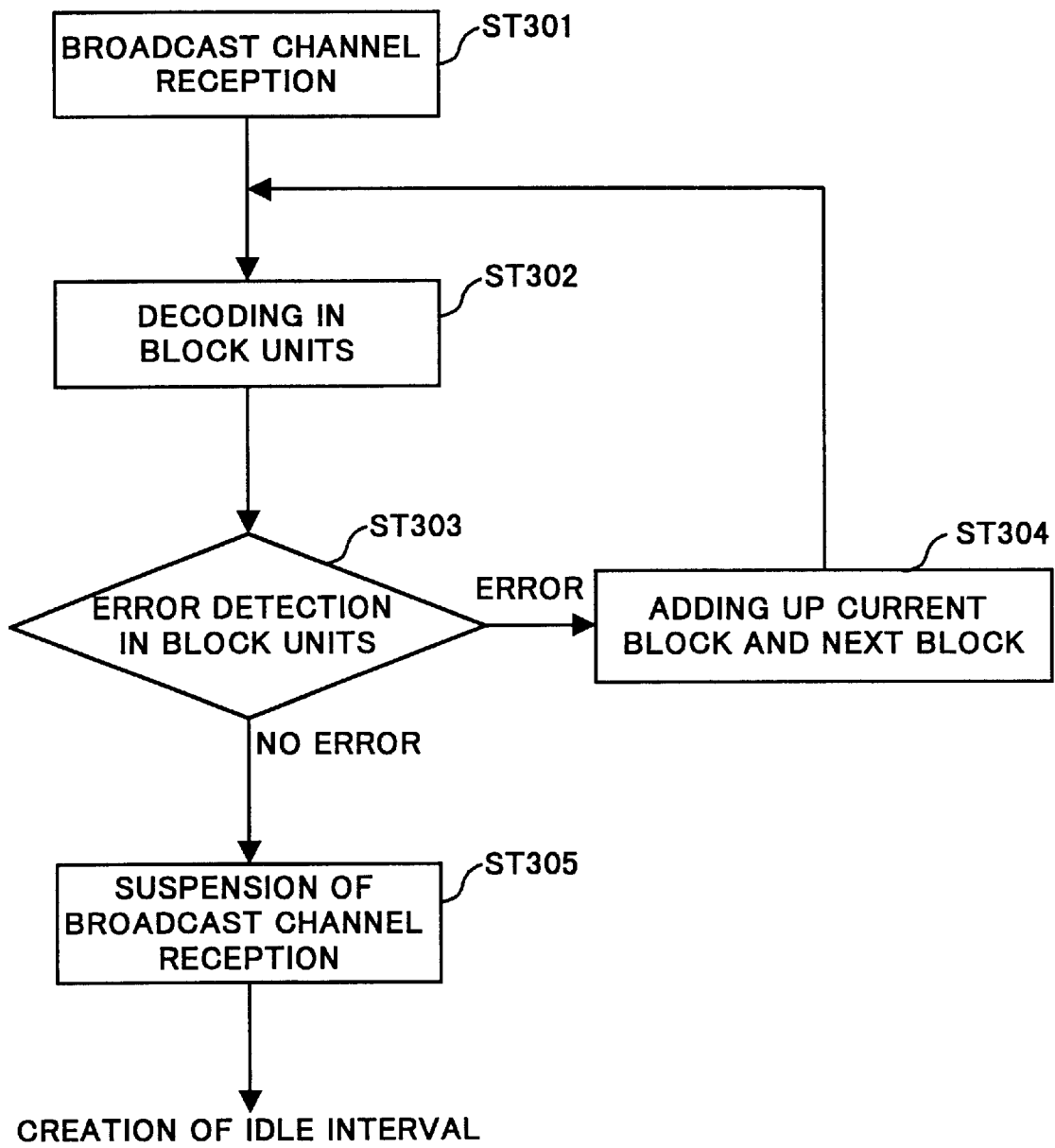
FIG. 6 is a flow chart to explain an idle interval formation process of the base station apparatus of the embodiment above.

Then with reference to FIG. 5 and FIG. 6, the following is an explanation of how the mobile station apparatus forms the idle interval. FIG. 5 is a block diagram showing the main parts of the mobile station apparatus of the present embodiment and FIG. 6 is a flow chart to explain the process of idle interval formation of the mobile station apparatus of the present invention.

First, its structure is explained using FIG. 5. Antenna 201 receives an RF signal and sends it to RxRF section 203 via RxRF switching section 202 which will be described later. RxRF section 203 converts the received signal from a carrier frequency to a baseband frequency. Then, A/D converter 204 converts the received signal to a digital signal and demodulation section 205 carries out demodulation.

Then, the received signal introduced into different system control channel reading section 200 enters block data memories 206. There are n block data memories 206 and the first block data memory stores the start block data of the broadcast channel signal repeatedly transmitted from the base station apparatus at least at a double transmission rate. n block data memories store the broadcast channel signal within one frame sequentially in block units. n can be determined arbitrarily. As will be detailed later, n needs to be at least the number of blocks in one frame and the minimum value of n is determined depending on at what multiple of transmission rate the base station apparatus transmits the broadcast channel signal. Block data memory storage control section 207 stores data of each block in block data memories 206.

Block decoder 208 decodes data stored in block data memories 206 or block data addition memory 212 which will be described later. This decoding is carried out in block units or in units of added blocks.

Error detection section 209 carries out error detection of the decoded data and notifies the detection result to block data memory storage control section 207, addition control section 210 which will be described later, frame internal control channel reading control section 216 and RxRF selection control section 213.

There are (n−1) adders 211, which add up data stored in block data memories 206 or block data addition memories 212 and store the added data in block data addition memory 212. Addition control section 211 sends the data added and stored in block data addition memories 212 to block decoder 208 and makes decoder 208 decode them. To reduce the size of the apparatus, the number of respective block data memories 206, adders 211 and block data addition memories 212 can be one, and in this case, these are used repeatedly.

When RxRF selection control section 213 receives a notice from error detection section 209 that the error rate is below the threshold, it switches RxRF switching section 202 and operates different system RxRF section 214. That is, reception of broadcast channel signals using RxRF section 203 is suspended. Different system demodulation processing section 215 performs A/D conversion, demodulation processing and decoding on the control channel signal of the different system received by different system RxRF section 214 as the need arises.

When frame internal control channel reading control section 216 receives a notice from error detection section 209 that the error rate is below the threshold, it operates frame internal control channel reading section 217. Frame internal control channel reading section 217 reads the control channel signal of a handover destination candidate demodulated from different system demodulation processing section 215.

Then, the procedure for forming an idle interval is explained with reference to FIG. 6. In ST301, antenna 201 receives a broadcast channel signal repeatedly transmitted from the base station apparatus at least at a double transmission rate. Then in ST302, the start block stored in first block data memory 206 is decoded in block decoder 208.

In ST303, error detection section 209 performs error detection of the decoded start block. In the case that the error rate exceeds the threshold, the step advances to ST304 and in the case that it is below the threshold the step advances to ST305.

In ST304, block data memory storage control section 207 that has received a notice that the error rate exceeds the threshold stores the second block data being demodulated or already demodulated by demodulation section 205 in second block data memory 206. Then, first adder 210 adds up the data stored in first block data memory 206 and the data stored in second block data memory 206 and stores the result in first block data addition memory 212. Addition control section 211 sends the addition result stored in first block data addition memory 212 to block decoder 208.

When such processing in ST304 finishes, the step goes back to ST302 and the data stored in first block data addition memory 212 are decoded by block decoder 208 and the step advances to ST303 where error detection is performed. In the case that the error rate exceeds the threshold, the step advances to ST304 again and in the case that the error rate is below the threshold, the step advances to ST305.

ST302 to ST304 above are repeated until the error rate falls below the threshold. In ST304 from the second time onward, block data memory storage control section 207 stores the next block (suppose the xth block) being demodulated or already demodulated by demodulation section 205 in xth block data memory 206. Then, xth adder 211 adds up the data of (x−1)th block data addition memory 212 and (x+1) the block data memory 206 and stores the result in xth block data addition memory 212. Addition control section 210 sends the addition result stored in first block data addition memory 212 to block decoder 208.

ST305, it is determined that the necessary one-frame data of the broadcast channel signal have been received and reception of further broadcast channel signals is suspended. That is, RxRF section selection control section 213 that receives a notice from error detection section 209 that the error rate is below the threshold switches RxRF switching section 202 and operates different system RxRF section 214. Thus, the rest of time until a one-frame time elapses is secured as the idle interval and the mobile station apparatus performs a cell search and monitors the control channel of a handover destination candidate.

Here, in the case that the error rate is below the threshold when the mobile station apparatus decodes the start block, for example, and in the case that the RxRF section is switched, the data of the broadcast channel received by RxRF section 203 after the reception of the start block to the switching of the RxRF section are discarded when error detection section 209 outputs the result that there is no error.

Thus, since the base station apparatus repeatedly transmits the block of compressed one-frame broadcast channel information within one frame, the mobile station apparatus that receives this can obtain one-frame information by only receiving one block at least. The mobile station apparatus suspends reception of broadcast signals when confirms that one-frame information of the broadcast signal is obtained, and thus the mobile station apparatus can have the rest of time until a one-frame time elapses as the idle interval. Therefore, the mobile station apparatus performs error detection one block at a time and suspends reception in the case that the error rate is below the threshold and adds up the next block that has the same information in the case that it exceeds the threshold and adds up one block after another until the error rate falls below the threshold.

In this way, the mobile station apparatus finishes reception of one-frame information in the shortest possible time and can secure the rest of time within one frame as the idle interval for a cell search.

For example, in the case that one frame is 10 msec and the base station apparatus repeatedly sends broadcast channel signals at a quadruple transmission rate, that is, it sends 4 blocks in 2.5 msec per block and the mobile station apparatus receives the start block without errors and it takes 1 msec from completion of reception of the start block to the switching of the RxRF section, then the mobile station apparatus can have 6.5 msec until a one-frame time elapses as the idle interval.

The length of the idle interval formed in this way depends on at what multiple of transmission rate the base station apparatus sends broadcast channel signals, how many blocks the mobile station apparatus received when it could receive the broadcast signal without errors according to the line quality at that time and the processing time required for the mobile station apparatus to perform error detection and RxRF section switching.

By the way, the mobile station apparatus performs reception of broadcast channel signals again after a one-frame time has elapsed. On and after the next frame time, the idle interval is formed likewise.

Figure 7:
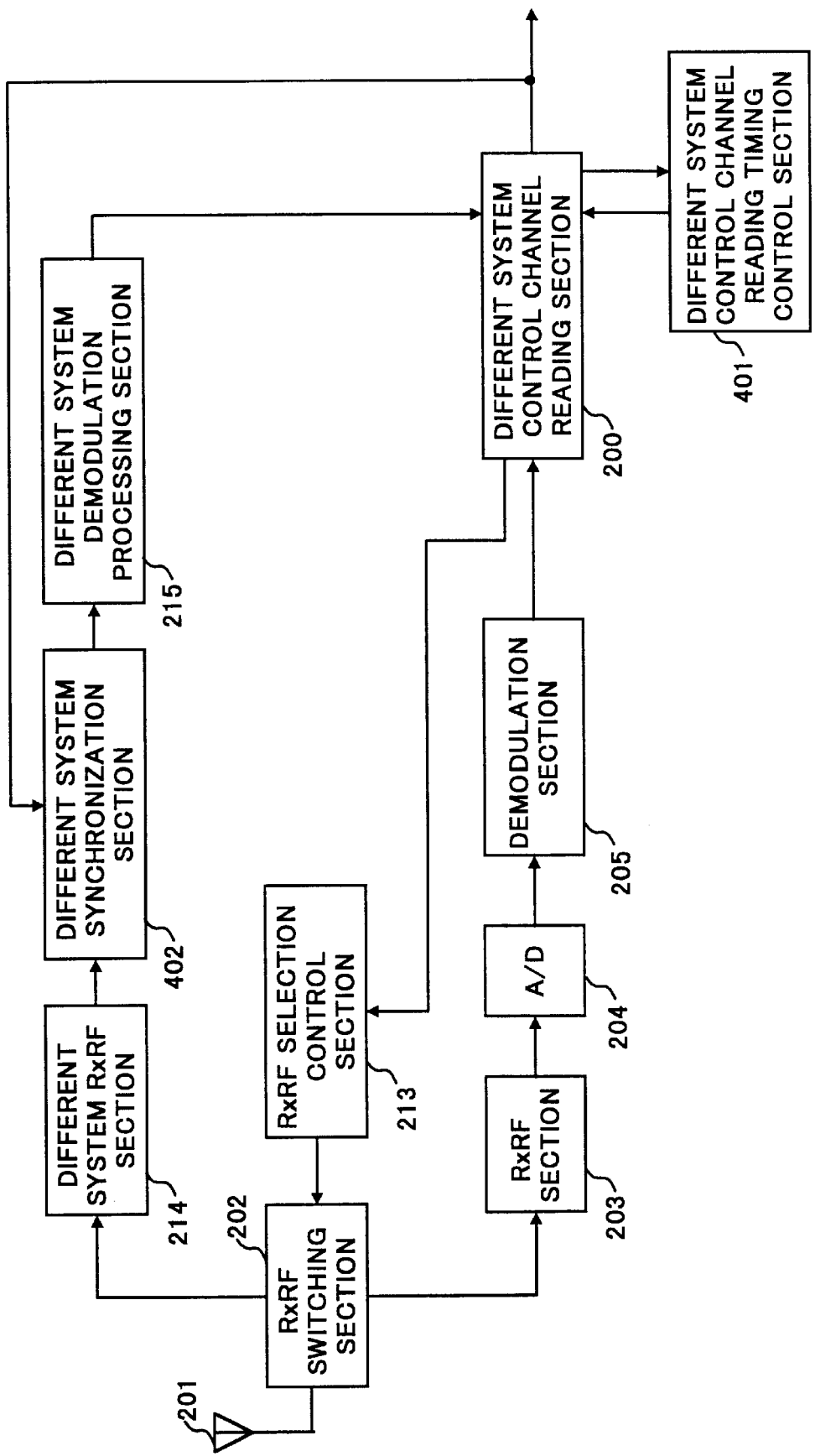
FIG. 7 is a block diagram showing the main parts of the mobile station apparatus of the embodiment above.

Then, using FIG. 7, the operation of the mobile station apparatus of the present embodiment for synchronizing when carrying out handover to a different mobile communication system using the idle interval formed as shown above is explained. FIG. 7 is a block diagram showing the main parts of the mobile station apparatus of the present embodiment. The structure that was explained using FIG. 5 is assigned the same symbols.

The sections from antenna 201 to demodulation section 205 have already been described, and so their explanations are omitted. In the case that in different system control channel reading section 200 it is determined that the error rate falls below the threshold and one-frame data of a broadcast channel have been received, RxRF section selection control section 213 switches RxRF switching section 202 and operates different system RxRF section 214.

In different system control channel reading section 200, frame internal control channel reading section 217 explained using FIG. 5 reads a control channel signal of a different system in the idle interval formed. The control channel information of the different system that has been read is sent to different system control channel reading timing control section 401 and an instruction of timing control is returned to different system control channel reading section 200. Different system control channel reading section 200 indicates the reading timing to different system synchronization section 402.

As shown above, the mobile station apparatus can establish a communication line with the different system by receiving control channel signals of the different system and synchronizing them. In the case that the handover destination is the same mobile communication system, the mobile station apparatus needs only to receive the control channel signals of the system in the idle interval formed above, it is obviously valid.

As already mentioned, the mobile communication system discussed here can be any system as long as it is a mobile communication system different from the CDMA system, whether it is a FDMA system or CDMA system.

For example, when the mobile station apparatus carries out handover to a PHS (Personal Handyphone System) that uses a TDMA system, the TDMA system based mobile station apparatus need to read a specific time slot with a specific frequency when reading control channel signals. Therefore, different control channel reading timing control section 401 controls different system control channel reading section 200 so that the mobile station apparatus may read the specific time slot with the specific frequency.

Figure 8:
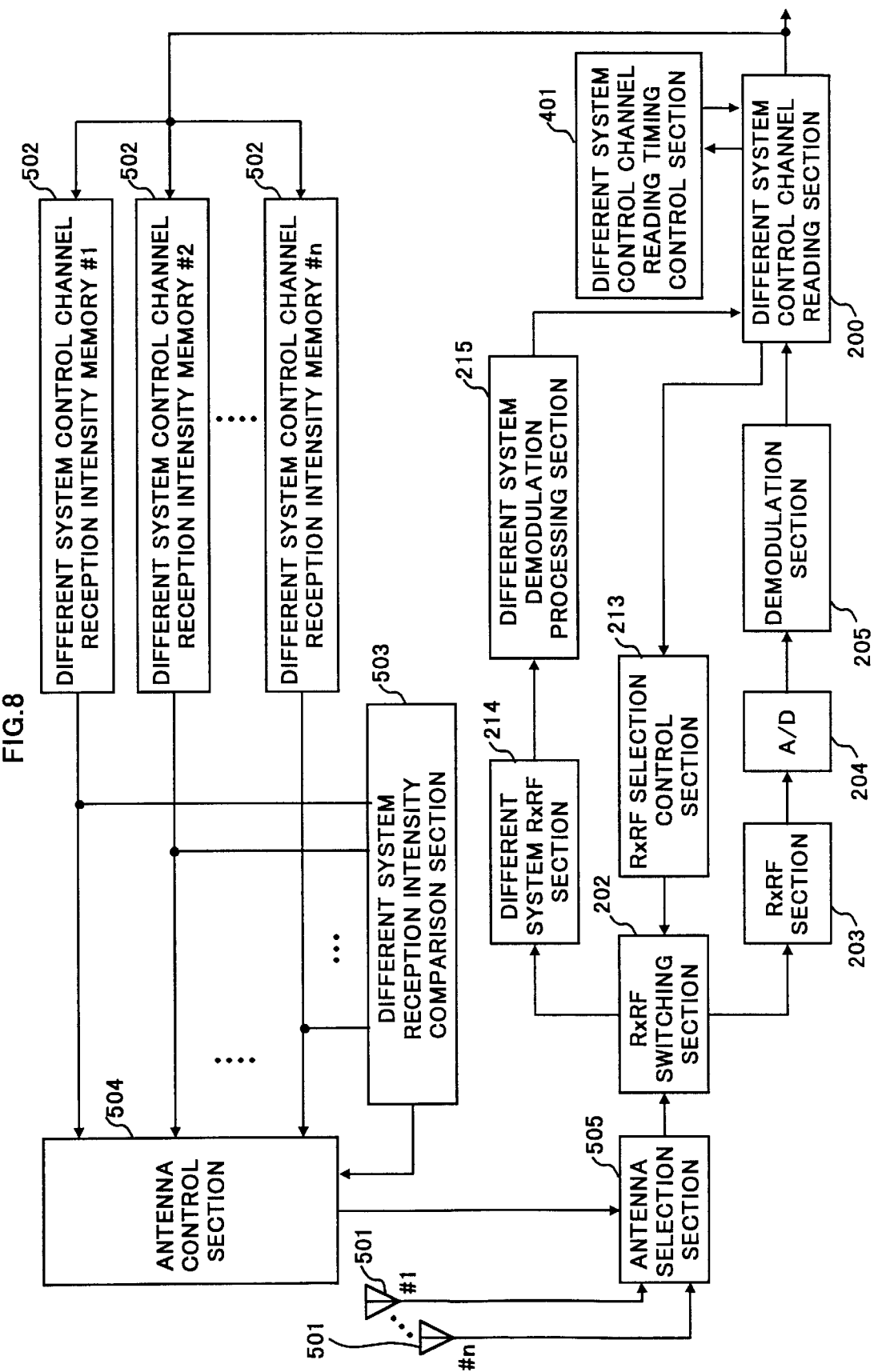
FIG. 8 is a block diagram showing the main parts of the mobile station apparatus of the embodiment above.

Then, using FIG. 8, the following is an explanation of the operation of carrying out antenna diversity in a different mobile communication system to which the mobile station apparatus of the present embodiment carries out handover using the idle interval formed. FIG. 8 is a block diagram showing the main parts of the mobile station apparatus of the present embodiment. The same symbols are used for the structure explained using FIG. 5 and FIG. 7.

There are a plurality of antennas 501 (suppose n antennas). The sections from RxRF switching section 202 to demodulation section 205 have already been explained and therefore they are omitted here. In different system control channel reading section 200, in the case that it is determined that the error rate falls below the threshold and one-frame data of a broadcast channel have been received, RxRF section selection control section 213 switches RxRF switching section 202 and operates different system RxRF section 214 and reception of a control channel signal of the different system starts.

Different system control channel reception intensity memories 502 are provided corresponding in number with antennas 501 (n in this case) and store the reception levels of respective antennas of the control channel signals of the different system to which handover is carried out while the mobile station apparatus is carrying out a cell search using the idle interval formed.

Different system reception intensity comparison section 503 compares the levels of respective antennas stored in #1 to #n of different system control channel reception intensity memories 502 and outputs the comparison result to antenna control section 504. Antenna control section 504 instructs antenna selection section 505 to select a signal from the antenna with the highest reception level.

Thus, the mobile station apparatus can prevent drastic deterioration of the line quality when it carries out handover to a different mobile communication system by carrying out antenna diversity when carrying out a cell search using the idle interval formed.

By the way, SIR (Signal to Interference Ratio) can also be used instead of the reception intensity above. Even if the handover destination is the same mobile communication system, the mobile station apparatus needs only to receive control channel signals of the system in the idle interval and it is obviously valid.

All the explanations above were given using a concept of a block that compresses one-frame information of the broadcast channel signal. The following is an example of explanation of what the actual slot structure will be like.

The slot structure example shown in FIG. 9 is of a mobile communication system according to a CDMA/TDD system and one-frame broadcast channel information is compressed to a one-time slot size and is sent by repeating one time for each subframe, that is, 4 times per one frame.

FIG. 9 is a schematic diagram showing the structure of a broadcast channel signal corresponding to a public service when the number of subframes is 4, and each base station apparatus transmits broadcast channel information 601 to be transmitted with only the last downlink slot of the subframe and repeatedly transmits the same information with the last downlink slots of all subframes. This broadcast channel information stores compressed information from A to D of each of communication terminal apparatus BS#1 to BS#4, and this broadcast channel information is stored in the last downlink slots.

In this case, too, as explained using the concept of a block, the mobile station apparatus receives the broadcast channel information of the last downlink slot of the first subframe, decodes it and carries out error detection, and in the case that the error rate exceeds the threshold, it can use the remaining downlink slot of one frame to monitor the control channel of the handover destination candidate.

Thus, the base station apparatus transmits one-frame information of the broadcast channel signal at least at a double transmission rate repeatedly during a one-frame time, eliminates the need for a blank time within a transmission signal, that is, eliminates the possibility of signal interruption, and thus eliminates the need to assign channel resources for the mobile station apparatus to acquire the timing of data that are added up and sent at a high transmission rate in the transmission signal. On the other hand, the mobile station apparatus receives and adds up this one-frame information repeatedly transmitted until no more error is detected, and suspends reception when there is no more error. This allows, during the rest of time until a one-frame time elapses after reception is suspended, the carrier information of the different mobile communication system to be monitored, enabling a cell search accompanied by smooth handover.

As explained above, the present invention avoids the cause for signal interruption in the radio communication line at the time of handover and makes it possible to form a blank time for the mobile station apparatus to receive control channels of a different mobile communication system without the need to assign further channel resources.

The present invention is not limited to the above described embodiments, and various variations and modifications may be possible without departing from the scope of the present invention.

This application is based on the Japanese Patent Application No. HEI 10-252993 filed on Sep. 7, 1998, entire content of which is expressly incorporated by reference herein.

What is claimed is:

1. A mobile station apparatus comprising:
    a receiver that receives data of a broadcast channel in which data to be transmitted in one frame are compressed to blocks of not more than half a frame, said blocks being repeatedly transmitted within the one frame;
    a detector that detects an error rate of each of the received blocks; and
    a reception controller that stops data reception with respect to the rest of the data of the broadcast channel within the one frame when the detected error rate falls below a predetermined threshold.

2. The mobile station apparatus according to claim 1, wherein said reception controller instructs a switching section to switch operation from a reception RF section in communication to another reception RF section, when the detected error rate falls below the predetermined threshold.

3. The mobile station apparatus according to claim 1, further comprising a cell searcher that monitors a control channel using a blank time within the one frame of the broadcast channel formed by said reception controller.

4. A mobile station apparatus comprising:
    a receiver that receives data of a broadcast channel in which data to be transmitted in one frame are compressed to blocks of not more than half a frame, said blocks being repeatedly transmitted within the one frame;
    an adder that adds the received blocks;
    a detector that detects an error rate of each of the added blocks; and
    a reception controller that stops data reception with respect to the rest of the data of the broadcast channel within the one frame, when the detected error rate falls below a predetermined threshold.

5. The mobile station apparatus according to claim 4, wherein said reception controller instructs a switching section to switch operation from a reception RF section in communication to another reception RF section, when the detected error rate falls below the predetermined threshold.

6. The mobile station apparatus according to claim 4, further comprising a cell searcher that monitors a control channel using a blank time within the one frame of the broadcast channel formed by said reception controller.

7. A mobile station apparatus signal reception method, comprising:
    receiving data of a broadcast channel in which data to be transmitted in one frame are compressed to blocks of not more than half a frame, the blocks being repeatedly transmitted within the one frame;
    detecting an error rate of each of the received blocks; and
    stopping data reception with respect to the rest of the data of the broadcast channel within the one frame when the detected error rate falls below a predetermined threshold.

8. A mobile station apparatus signal reception method, comprising:
    receiving data of a broadcast channel in which data to be transmitted in one frame are compressed to blocks of not more than half a frame, the blocks being repeatedly transmitted within the one frame;
    adding the received blocks;
    detecting an error rate of each of the added blocks; and
    stopping data reception with respect to the rest of the data of the broadcast channel within the one frame when the detected error rate falls below a predetermined threshold.

9. A cell search method for a mobile station apparatus, comprising:
    receiving data of a broadcast channel in which data to be transmitted in one frame are compressed to blocks of not more than half a frame, the blocks being repeatedly transmitted within the one frame;
    switching a reception RF section in communication, to another reception RF section when an error rate of the one frame of the broadcast channel falls below a predetermined threshold; and
    monitoring a channel of a handover destination candidate by using a blank time within the one frame of the broadcast channel.

10. A cell search method of a mobile station apparatus, comprising:
    receiving data of a broadcast channel in which data to be transmitted in one frame are compressed to blocks of not more than half a frame, the blocks being repeatedly transmitted within the one frame;
    forming a blank time in the one frame of the broadcast channel by stopping data reception with respect to the subsequent data of the broadcast channel when an error rate of the one frame of the broadcast channel falls below a predetermined threshold; and
    monitoring a channel of a handover destination candidate by using the blank time.

* * * * *